United States Patent [19]

Hedgcock et al.

[11] 4,240,534
[45] Dec. 23, 1980

[54] GEARED STEERING MEANS

[75] Inventors: Richard L. Hedgcock; Gerald E. Whitehurst, both of East Peoria, Ill.

[73] Assignee: Caterpillar Tractor Co., Peoria, Ill.

[21] Appl. No.: 11,599

[22] Filed: Jan. 26, 1979

[51] Int. Cl.³ .................. F16D 67/02; B60K 41/24
[52] U.S. Cl. ........................... 192/13 R; 74/781 R
[58] Field of Search ............ 192/3.52, 3.61, 3.62, 192/4 A, 12 C, 13 R, 49, 48.1, 70.2, 70.11, 87.11, 87.13, 91 A; 180/6.7, 6.2; 74/790, 789, 781 R, 710.5

[56] References Cited

U.S. PATENT DOCUMENTS

| | | | |
|---|---|---|---|
| 2,876,657 | 3/1959 | Allin et al. | 74/710.5 |
| 2,876,659 | 3/1959 | Richardson | 74/710.5 |
| 3,601,211 | 8/1971 | Finke | 74/710.5 |
| 4,082,156 | 4/1978 | Krolak et al. | 192/13 R |
| 4,128,023 | 12/1978 | Kinder | 192/91 A |

*Primary Examiner*—George H. Krizmanich
*Attorney, Agent, or Firm*—Wegner, Stellman, McCord, Wiles & Wood

[57] ABSTRACT

A geared steering clutch mechanism (18) for use in a vehicle having left and right side propelling devices (11,12) such as tracks, a power drive (16), and a final drive (15) connecting the power drive to the respective left and right propelling devices. The steering clutch mechanism includes a first clutch (24) selectively operable to connect the power drive to the associated final drive to provide a high speed connection therebetween, a speed reduction gear assembly (55,56,58), a second clutch (45) selectively operable to connect the power drive to the associated final drive through the speed reduction gear assembly to provide a reduced speed connection therebetween, and a brake (38) for braking the final drive concurrently with arranging the clutches to positively disconnect the power drive from the final drive. The final drive may be a multispeed drive so that the use of the clutch mechanism provides a two-time multiplication of the number of available output speeds as a function of the selective operation of the clutches. The speed reduction gear assembly may include a planetary gear (56) in meshing engagement with a sun gear (55) connected to the second clutch. The first clutch may be arranged to provide a substantially direct one-to-one driving connection between the power drive and final drive.

10 Claims, 5 Drawing Figures

GEARED STEERING MEANS

DESCRIPTION

1. Technical Field

This invention relates to vehicle drives and in particular to a geared steering clutch mechanism for use in selectively operating left and right side propelling means of a vehicle to effect a controlled steered driving of the vehicle.

2. Background Art

In U.S. Pat. No. 2,876,659, of Pierce F. Richardson, a steering means is shown for a crawler tractor, permitting the tractor to make a definitely controlled gradual turn and a pivot turn. To effect such turning operation, the mechanism is arranged so as to provide a slip clutch effect wherein a brake drum 27 is engaged slightly by its engaging part 28 so as to slow down the brake drum and thereby slow down a gear 30 and a gear 16. At the same time, a gear 22 drives a gear 15 through an intermediate gear 21 so as to speed up the gear 15. Thus, a driving of one track of the vehicle causes it to overrun the other track so as to turn the vehicle. In making a pivot turn, the right hand brake drum 24 is stopped so as to slow down gear 15 to a minimum low speed while the left hand track is maintained stationary by the application of the brake in that system. The slippage of the brake in the manner of a slip clutch presents a serious problem in the maintenance requirements of the mechanism where substantial loads are involved, as in the normal operation of such tractor vehicles.

DISCLOSURE OF THE INVENTION

The present invention comprehends an improved geared steering clutch mechanism for use in a vehicle drive for providing turning action in the controlled steering of the vehicle.

More specifically, the invention comprehends providing in a vehicle having left and right side propelling means power drive means having an output drive shaft means, a first multispeed transmission connection to the left side propelling means, and a second multispeed transmission connected to the right side propelling means, an improved geared steering clutch mechanism arranged for selectively driving from the drive means the transmission so as to selectively provide a high speed output, a reduced speed output, and a brake condition of either or both of the transmissions and associated propelling means.

In the illustrated embodiment, the clutch mechanism includes a first clutch selectively operable to connect the input means to the output means to provide a high speed connection therebetween, speed reduction gear means, a second clutch selectively operable to connect the input means to the output means through the speed reduction gear means to provide a reduced speed connection therebetween, and means for selectively braking the output means concurrently with arrangement of the first and second clutches to positively disconnect the input means from the output means.

The transmissions comprise multispeed transmissions and, thus, the clutch mechanism is operable selectively to provide a two-time multiplication of the number of available output speeds from the transmission as a function of the selective operation of the clutches.

In the illustrated embodiment, the speed reduction means includes a planetary gear with the second clutch being connected to a sun gear meshing with the planetary gear and operable to selectively lock the sun gear to effect transmission of power from the drive to the transmission through the planetary gear. The planetary gear further meshes with a ring gear of the speed reduction means to effect the desired control of the output speed.

The geared steering clutch mechanism of the present invention may comprise a modular unit which may be readily substituted for conventional nongeared steering units for improved steering operation of the vehicle.

In the illustrated embodiment, the low speed operation is approximately 25 percent less than the high speed operation of the transmission. The low speed operation comprises a direct geared connection between the drive and transmission so as to provide a positive driving of one track of the vehicle at a reduced speed while driving the other track at normal or high speed so as to effect the desired turn.

The provision of the geared steering clutch means provides an improved long life to the track and drive train components of the vehicle. The use of a positive drive to both tracks in the turning operation provides improved application of torque and minimized track slippage in the turning operation. By sharing the available power between the two tracks, a more positive turning of the vehicle is effected.

BEST MODE FOR CARRYING OUT THE INVENTION

Figure 1:
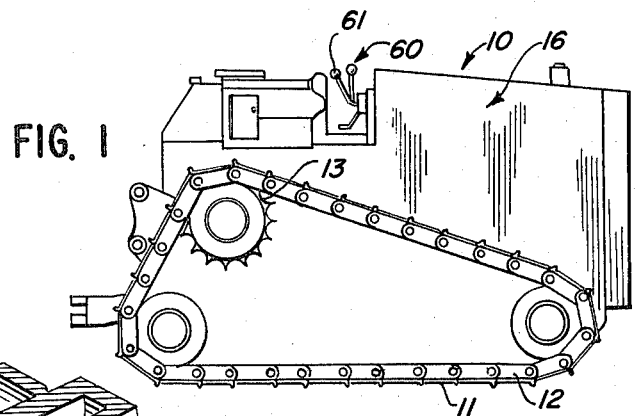
FIG. 1 is a side elevation of a vehicle having a geared steering clutch mechanism embodying the invention.
Figure 2:
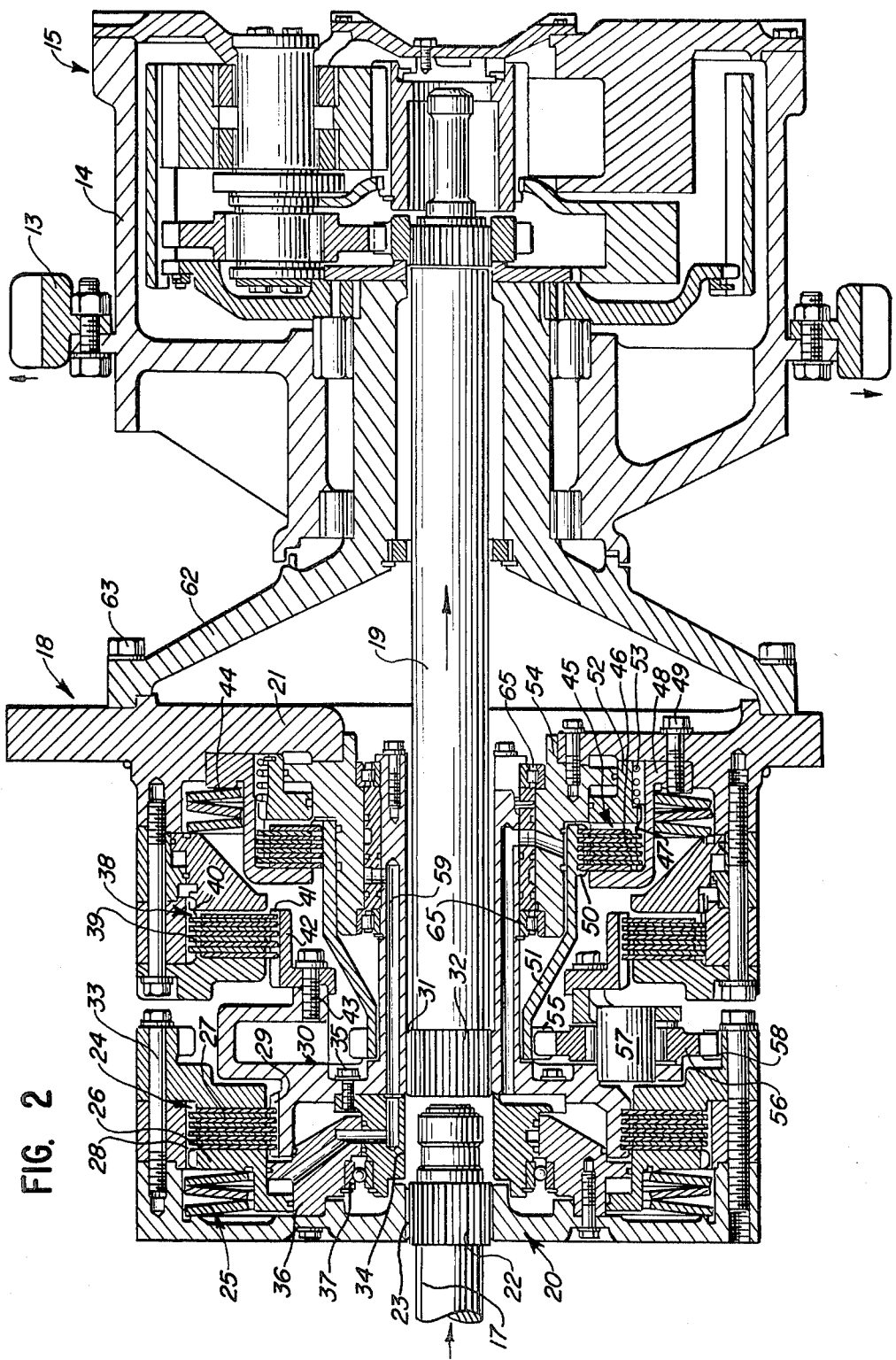
FIG. 2 is a diametric section of the geared steering clutch mechanism and transmission means of the vehicle.

In the illustrative embodiment of the invention as disclosed in the drawing, a vehicle generally designated 10 is shown to comprise a tractor vehicle having propelling means in the form of a right side track 11 and a left side track 12, track 12 being shown fragmentarily in FIG. 1. The tracks are driven by a suitable drive sprocket 13 mounted to a drive hub 14 of a final drive 15. In FIG. 2, a single drive sprocket 13, hub 14 and final drive assembly 15 is illustrated, it being understood that a similar arrangement is provided for each of the tracks 11 and 12 at opposite sides of the vehicle.

The vehicle further includes a powered drive 16 which may comprise a conventional internal combustion engine or the like. The power drive defines output drive shaft means 17 having opposite ends connected one each to the right and left side final drives 15 through geared steering clutch mechanisms generally designated 18, the right side geared steering clutch mechanism being illustrated in FIG. 2, it being understood that a similar mechanism is associated with the lefthand end of the drive shaft 17.

Final drives 15 comprise conventional transmission means adapted to provide a multispeed output from an input shaft 19 to the sprocket 13 under the control of the vehicle operator.

As indicated above, the invention comprehends an improved geared steering clutch mechanism 18 which is selectively operable to cause the shaft of each of the final drives 15 to be driven concurrently by a high speed connection to the drive shaft means 17, concurrently through a low speed connection to the drive shaft 17, concurrently with one of the shafts 19 connected through the high speed connection and the other of the shafts 19 connected to the low speed connection to the drive shaft means 17, and the drive shafts 19 of both final drives concurrently braked with the clutches operated to disconnect the final drives from the drive shaft means 17. In each of the driving connections, the final drives are positively connected to the drive shaft means to provide a positive controlled operation of the vehicle for an improved driving and steering thereof.

More specifically, the clutch mechanism 18 includes a first housing 20 and a second housing 21. Housing 20 is connected to a pinion 22 on the drive shaft means 17 through an internal gear 23 and carries the high speed clutch 24. Clutch 24 includes a biasing spring 25 acting on a piston 26 of the clutch for facially engaging the clutch plates 27 of the clutch. The clutch plates are alternately connected to an outer spline 28 associated with housing 20 and an inner spline 29 on a drive hub 30 having an internal gear 31 meshed with a pinion 32 on the distal end of the shaft 19. Clutch 24 is provided with suitable bolt means 33 for providing disassembly thereof when desired. Hub 30 is secured to an annular support 34 by suitable bolts 35. The support 34 supports the piston cylinder 36 on suitable bearings 37.

Hub 30 is connected to the fixed housing 18 by the brake 38 having a plurality of brake plates 39 alternately connected to a spline 40 on the housing 18, and a spline 41 of a carrier 42 secured to the drive hub 30 by suitable means, such as bolts 43. The brake 38 includes biasing spring means 44 for biasing the brake to the applied condition, as shown in FIG. 2.

The second, low speed clutch 45 includes a plurality of clutch plates 46 which are alternately connected to a spline 47 on a carrier 48 secured to the housing 18 by suitable means, such as bolts 49, and to a spline 50 on an annular gear carrier 51. The piston 52 of clutch 45 is biased by means of a coil spring 53 to engage the respective plates 46 of the clutch. The piston is carried in a cylinder 54 which is rotatably carried by means of bearing 65 on the drive hub 30.

Carrier 51 is provided with an internal sun gear 55. Three planetary gears 56 internally mesh with the sun gear 55 and are carried on a hub 57 rotatably mounted on the drive hub 30. The planetary gears further mesh with a ring gear 58 carried on the housing 20.

Suitable fluid passages 59 may be provided in the mechanism 18 for providing controlled delivery of hydraulic fluid to the piston chambers for selectively overcoming the biasing action of the respective springs 25, 44, and 53 to effect selective energization of the clutch 24, brake 38, and clutch 45 in the operation of mechanism 18.

Figure 3:
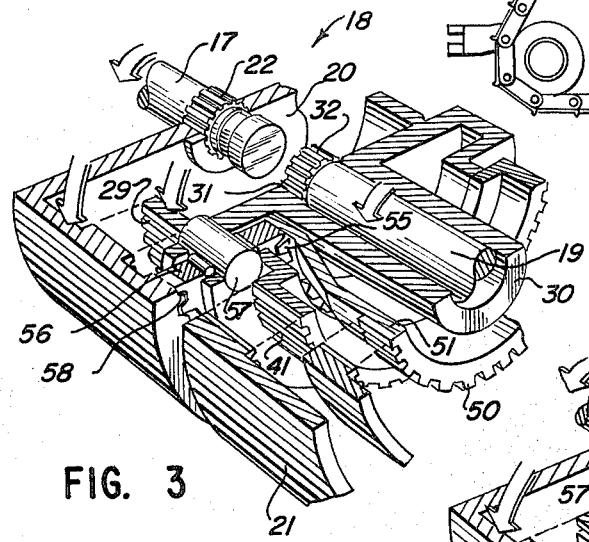
FIG. 3 is a fragmentary isometric view illustrating the arrangement of the geared steering clutch mechanism in the high speed mode.
Figure 5:
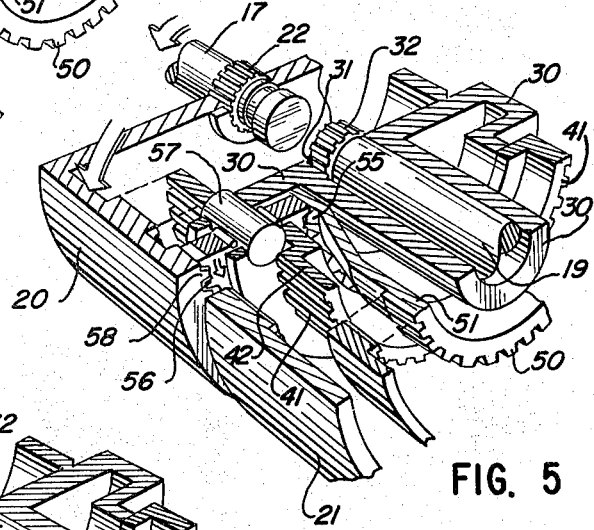
FIG. 5 is a fragmentary isometric view illustrating the arrangement of the geared steering clutch mechanism in the braking condition.
Figure 4:
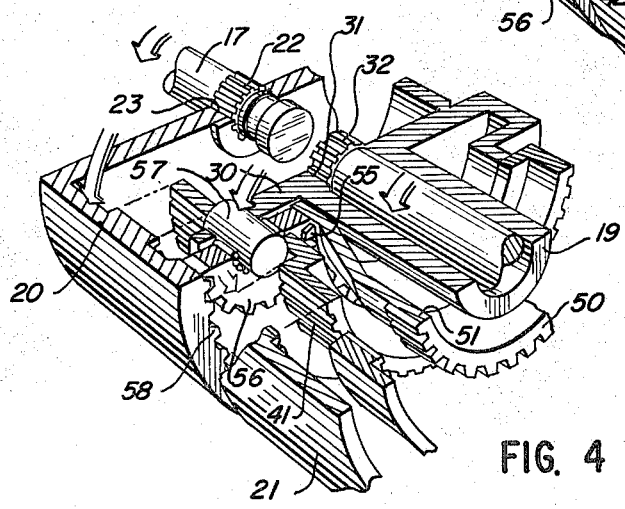
FIG. 4 is a fragmentary isometric view illustrating the arrangement of the geared steering clutch mechanism in the low speed arrangement.

The arrangement and operation of the steering clutch mechanism 18 in the high, low and braking modes is illustrated in FIGS. 3, 4 and 5, respectively. More specifically, as shown in FIG. 3, in the high speed arrangement of clutch mechanism 18, the drive shaft means 17 is connected effectively directly to the final drive shaft 19 in a one-to-one speed ratio. In this arrangement, both the brake 38 and low speed clutch 45 are de-energized, while the high speed clutch 24 is energized to connect housing 20 to the drive hub 30 as a result of the engagement of the clutch plates 27 so as to effectively connect outer spline 28 with inner spline 29. As drive shaft 17 is directly geared to the housing 20 and as the final drive shaft 19 is directly geared to the drive hub 30, a direct drive of the final drive shaft 19 from the drive shaft 17 is thereby effected. In this arrangement, the speed range of the vehicle drive is provided solely by the transmission in the normal manner as by suitable manipulation of the speed controls 60 by the vehicle operator. With each of tracks 11 and 12 so driven, the vehicle may be operated in the normal travel mode.

When it is desired to turn the vehicle in either direction, i.e., in either the left or right, the track on the side of the vehicle opposite to the direction in which the turn is to be made, is maintained in the high connection discussed above. However, the track on the side of the vehicle in the direction in which the turn is desired is now connected through the geared steering clutch mechanism 18 in its low mode, as illustrated in FIG. 4. As shown therein, in the low mode, the high speed clutch 24 is de-energized, i.e., the clutch plates 27 are spaced apart by suitable pressurized operation of the pressure piston 26, the brake 38 is maintained de-energized, but the low speed clutch 45 is now energized to lock the gear carrier 51 to the housing 21, thereby locking the sun gear 55 and causing the planetary gears 56 to walk around the sun gear as they are driven by the ring gear 58 fixed to the input housing 20. The movement of the planetary gears is transferred through the hub 57 to the drive hub 30 so as to drive the final drive shaft 19 at a reduced speed relative to the input shaft 17 rotation. In the illustrated embodiment, the low speed drive of the final drive shaft 19 provides a 25 percent speed reduction, it being understood that any suitable speed reduction may be effected by suitably selecting the gear teeth ratio on the gears 55, 56, and 58. In the illustrated embodiment, the ring gear is provided with 62 teeth, the sun gear is provided with 22 teeth, and the planetary gears are provided with 20 teeth each.

With one of the tracks being driven directly from the drive shaft means 17 and the other track being driven positively at 75 percent of the speed of the track 11, the tractor vehicle is caused to turn positively with power applied to both tracks. In the illustrated embodiment, the use of the steering clutch mechanism 18 in the tractor illustrated in FIG. 1 provides a turning radius of approximately 33 feet.

Operation of the steering clutch mechanism in the high and low speed modes may be controlled by suitable levers 61 adjacent the transmission controls 60. It should be noted that when desired, both of the clutch mechanisms 18 may be arranged in the low speed mode by arranging each in the arrangement of FIG. 4. Under this operating condition, the final drive shafts 19 are each driven at 75 percent of the speed of the drive shaft means 17 so that the final drives 15 associated with each of the tracks are then caused to operate over a different speed range from the range obtained when the final drive shafts 19 are directly coupled to the drive shaft means 17. Thus, the clutch mechanism 18 effectively provide for doubling the number of output speeds of the sprockets 13 by providing two different final drive shaft speeds 19 in the driven mode of operation of the vehicle. Thus, the improved clutch mechanism 18 not only provide for improved positive turning of the vehicle, but also provide for improved extended speed and power range operation of the vehicle.

When it is desired to brake either or both of the tracks 11 and 12, the clutches 24 and 45 are de-energized so as to preclude delivery of torque from the input shaft means 17 to the final drive shaft 19. At the same time, brake 38 is energized so as to engage the plates 39 thereof, thereby interconnecting the carrier 42 connected to the drive hub 30, with the fixed housing 21 as a result of the interconnection of splines 40 and 41, thereby braking the drive shafts 19 and the respective associated tracks 11 and 12.

It should further be noted that, if desired, one of the tracks may be so braked while the other of the tracks may be driven either through the high speed or low speed connection of the clutch mechanism 18, as discussed above, so as to cause a pivoting of the vehicle about the brake track. In this mode of operation, it should be noted that the operator has the further ability to effect the positive drive of the single driving track at either the the high speed direct connection from the drive shaft means 17 or at the reduced speed effected by the arrangement of the clutch mechanism, as discussed above and shown in FIG. 4. Thus, a still further controlled turning of the vehicle may be effected by means of the improved geared steering clutch mechanism 18 of the present invention.

As seen in FIG. 2, the clutch mechanism 18 is extremely simple and economical of construction and is compactly arranged so that the mechanism may be utilized as a substitute clutch mechanism for the conventional non-geared clutch mechanisms of the prior art. As shown in FIG. 2, the entire clutch mechanism 18 may be removed as a unit by now being secured to the housing portion 62 of the final drive 15 by suitable removable securing means, such as bolts 63.

Other aspects, objects and advantages of this invention can be obtained from a study of the drawings, the disclosure and the appended claims. The foregoing disclosure of specific embodiments is illustrative of the broad inventive concepts comprehended by the invention.

We claim:

1. A geared steering clutch mechanism (18) for selectively driving a rotary shaft input means (17), a rotatable hub (30), connecting means (31,32) drivingly connecting the hub to the output means, said clutch mechanism being arranged to provide selectively a high speed connection of the input and output means, a reduced speed connection of the input and output means, and a braked condition of the output means disconnected from the input means, said clutch mechanism comprising:

a first clutch (24) selectively operable to connect the input means through said hub to the output means to provide a high speed connection therebetween; speed reduction gear means (55,56,58);

a second clutch (45) selectively operable to connect the input means to the output means through said speed reduction gear means and said hub to provide a reduced speed connection therebetween, said first and second clutches being selectively arrangeable concurrently to positively disconnect the input means from the output means; and means (38) for selectively retaining said hub against rotation and as a result thereof braking the output means solely through said connecting means concurrently with the arrangement of said first and second clutches to positively disconnect the input means from the output means.

2. The geared steering clutch mechanism of claim 1 wherein said clutch mechanism (18) is operable selectively to provide a two-time multiplication of the number of available output speeds as a function of the selective operation of said clutches.

3. The geared steering clutch mechanism of claim 1 wherein said speed reduction means includes a ring gear (58) rotatable with said input means (17), and a planetary gear (56) meshing within said ring gear, said second clutch (45) being connected to a sun gear (55) meshing with said planetary gear and operable to selectively lock the sun gear to effect transmission of power from the input means to the output means through said planetary gear.

4. The geared steering clutch mechanisms of claim 1 wherein said first clutch (24) is arranged to selectively connect the input means to the output means in direct one-to-one driving relation.

5. The geared steering clutch mechanism of claim 1 wherein said speed reduction gear means (55,56,58) provides an output means speed reduction of at least approximately 25 percent relative to the speed thereof effected by said first clutch connection.

6. In a vehicle having a left side propelling means (12) and a right side propelling means (11), powered drive means (16) having output drive shaft means (17), a first final drive (15) connected to said left side propelling means, and a second final drive (15) connected to said right side propelling means, the improvement comprising:

a first geared steering clutch mechanism (18) connected between said powered drive output drive shaft means and said first final drive; and a second geared steering clutch mechanism (18) connected between said powered drive output drive shaft means and said second final drive transmission, each of said clutch mechanisms including a first clutch (24) selectively operable to connect the output drive shaft means through a rotatable drive member (30) connected to the associated final drive through a connecting means (31,32) to provide a high speed connection therebetween, speed reduction gear means (55,56,58), a second clutch (45) selectively operable to connect the output drive shaft means to said associated final drive through said speed reduction gear means and said drive member (30) to provide a reduced speed connection therebetween, said first and second clutches being selectively arrangeable concurrently to positively disconnect the input means from the output means, and means (38) for selectively retaining said drive member against rotation and as a result thereof braking said associated final drive solely through said connecting means (31,32) concurrently with the arrangement of said first and second clutches to positively disconnect the output drive shaft means from said associated final drive means, whereby said propelling means may be selectively positively driven concurrently through said high speed connection, concurrently through said low speed connection, concurrently with one propelling means connected through said high speed connection and the other propelling means connected through said low speed connection, or both propelling means disconnected from said drive shaft means and braked.

7. The vehicle structure of claim 6 wherein said propelling means (11,12) comprise tracks connected to said final drive (15) means through driver sprockets (13).

8. The vehicle structure of claim 6 wherein said drive shaft means (17) is connected to the final drive means (15) through a ring gear (58) meshing with a planetary gear (56), said second clutch (45) being connected to a sun gear (55) meshing with said planetary gear and operable to selectively lock the sun gear to effect transmission of power from the drive shaft means to the final drive through said planetary gear.

9. The vehicle structure of claim 6 wherein said first clutch (24) is arranged to selectively connect the drive shaft means (17) to the final drive means (15) in direct one-to-one driving relation.

10. The vehicle structure of claim 6 wherein said speed reduction gear means (55,56,58) provides a speed reduction of at least approximately 25 percent.

* * * * *